(12) United States Patent
Son et al.

(10) Patent No.: US 9,164,324 B2
(45) Date of Patent: Oct. 20, 2015

(54) LIQUID CRYSTAL DISPLAY DEVICE AND MANUFACTURING METHOD THEREOF

(71) Applicant: LG DISPLAY CO., LTD., Seoul (KR)

(72) Inventors: Kyung Mo Son, Paju-si (KR); Dong Kyu Lee, Gunsan-si (KR); Eun Hye Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 66 days.

(21) Appl. No.: 14/139,391

(22) Filed: Dec. 23, 2013

(65) Prior Publication Data

US 2014/0320789 A1 Oct. 30, 2014

(30) Foreign Application Priority Data

Apr. 29, 2013 (KR) .................. 10-2013-0047516

(51) Int. Cl.
 *G02F 1/1337* (2006.01)
 *G02F 1/1339* (2006.01)
 *G02F 1/1333* (2006.01)

(52) U.S. Cl.
 CPC ............ *G02F 1/1337* (2013.01); *G02F 1/1339* (2013.01); *G02F 1/133345* (2013.01); *G02F 2001/133388* (2013.01); *G02F 2201/50* (2013.01); *G02F 2202/28* (2013.01); *Y10T 156/10* (2015.01); *Y10T 156/1056* (2015.01)

(58) Field of Classification Search
 CPC .................... G02F 1/133788; G02F 1/133753; G02F 1/133711; G02F 1/13378; G02F 2001/133757; G02F 2001/133742; G02F 1/133734; G02F 1/1337; G02F 1/133363; G02F 1/13394; G02F 1/13392; G02F 1/133512
 USPC .......................... 349/123, 124, 125, 155, 156
 See application file for complete search history.

(56) References Cited

U.S. PATENT DOCUMENTS

| | | | |
|---|---|---|---|
| 2007/0091247 A1* | 4/2007 | Onda | 349/153 |
| 2010/0045922 A1* | 2/2010 | Motomatsu | 349/156 |

* cited by examiner

*Primary Examiner* — Mike Qi
(74) *Attorney, Agent, or Firm* — Dentons US LLP

(57) ABSTRACT

A liquid crystal display (LCD) device and a manufacturing method thereof are provided. An alignment layer and a seal pattern are formed to overlap to reduce a width of a bezel, and one or more alignment layer spreading preventing means are formed to prevent a degradation of adhesive strength between the seal pattern and a substrate due to the characteristics of the alignment layer.

17 Claims, 6 Drawing Sheets

LIQUID CRYSTAL DISPLAY DEVICE AND MANUFACTURING METHOD THEREOF

CROSS-REFERENCE TO RELATED APPLICATIONS

This application claims the benefit of Korean Patent Application No. 10-2013-0047516, filed on Apr. 29, 2013, which is hereby incorporated by reference for all purposes as if fully set forth herein.

BACKGROUND OF THE INVENTION

1. Field of the Invention

The present disclosure relates to a liquid crystal display (LCD) device. More particularly, the present invention relates to an LCD device in which a bezel is reduced in width, and a manufacturing method thereof.

2. Discussion of the Related Art

As display devices providing more convenient interfaces between human beings and information through visual representation of various types of information have been developed, research into and commercialization of lightweight, thin flat panel displays (FPDs) that may replace cathode ray tubes (CRTs) as existing display devices, has been accelerated.

In the FPD field, liquid crystal displays (LCDs) have been commonly used. An LCD device is composed of a liquid crystal panel implementing image information, a driving unit that drives the liquid crystal panel, and a backlight unit that supplies light to the liquid crystal panel.

FIG. 1 is a schematic plan view of a related art LCD device, and FIG. 2 is a cross-sectional view taken along line II-Ii' in FIG. 1.

Referring to FIGS. 1 and 2, the related art LCD device 1 is formed by attaching an array substrate 2 and a color filter substrate 3 with a liquid crystal layer (not shown) interposed therebetween.

A plurality of signal lines (not shown) are formed to cross each other in the array substrate 2. Pixels (not shown) are formed in regions formed as the signal lines cross each other, and a plurality of thin film transistors (not shown) are formed in intersections of the signal lines. Also, an alignment layer, namely, a first alignment layer 4a, for aligning liquid crystal molecules of the liquid crystal layer is formed on the uppermost portion of the array substrate 2.

A plurality of R, G, and B color filters (not shown) corresponding to the pixels of the array substrate 2 are formed on the color filter substrate 3, and black matrices 5 for preventing light leakage are formed in the other remaining regions excluding the pixels. Also, an alignment layer, namely, a second alignment layer 4b, for aligning liquid crystal molecules of the liquid crystal layer is formed on the upper most portion of the color filter substrate 3.

The array substrate 2 and the color filter substrate 3 face each other with a predetermined gap, and a plurality of column spacers 6 may be formed in order to maintain the gap therebetween.

Here, the array substrate 2 and the color filter substrate 3 are attached by a seal pattern 7 formed on the outer edges thereof, respectively. Also, the column spacer 6 may be formed in a non-display region N/A, as well as in a display region A/A, to allow the two substrates to have the same gap in the center and in the outer edges.

The foregoing LCD device 1 includes the display region A/A in which an image is substantially displayed and the non-display region N/A formed to surround the display region A/A. The non-display region N/A is covered by a bezel.

In this case, a width of the non-display region N/A of the LCD device 1 is increased due to the alignment layers 4a and 4b, the column spacer 6, the seal pattern 7, and the like, and thus, a width of the bezel is also increased.

In other words, the related art LCD device 1 requires an alignment layer margin region D1 in consideration of a spreading phenomenon of the alignment layers 4a and 4b formed on the array substrate 2 and the color filter substrate 3, respectively.

Also, the related art LCD device 1 requires a spacer region D2 due to the presence of the column spacer 6 formed to maintain the same height in the central portions and the outer edges of the two attached substrates.

In addition, the related art LCD device 1 requires a seal pattern region D3 due to the presence of the seal pattern 7 formed to attach the array substrate 2 and the color filter substrate 3. Also, the related art LCD device 1 requires a cutting region D4 for a margin in the event of cutting.

All of the alignment layer margin region D1, the space region D2, the seal pattern region D3, and the cutting region D4 form the non-display region N/A, and thus, the total width (D1+D2+D3+D4) of the bezel is increased. The increase in the width of the bezel increases an overall size of the LCD device 1.

SUMMARY OF THE INVENTION

Therefore, an aspect of the detailed description is to provide a liquid crystal display (LCD) device in which a width of a bezel region is reduced by forming alignment layers and a seal pattern in an overlapping manner and a reduction in adhesive strength of the seal pattern due to characteristics of the alignment layers is prevented by forming one or more alignment layer spreading preventing means, and a manufacturing method thereof.

To achieve these and other advantages and in accordance with the purpose of this specification, as embodied and broadly described herein, a liquid crystal display (LCD) device may include: a liquid crystal panel including first and second substrates which include a display region and a non-display region, have an alignment layer formed thereon, and are bonded in a facing manner; a seal pattern formed in the non-display region between the first and second substrates to attach the first and second substrates; and one or more spreading preventing means formed to overlap with the seal pattern in at least one of the first and second substrates and preventing spreading of the alignment layer to reduce a contact area of the seal pattern and the alignment layer.

To achieve these and other advantages and in accordance with the purpose of this specification, as embodied and broadly described herein, a liquid crystal display (LCD) device may include: a liquid crystal panel including first and second substrates which include a display region and a non-display region, have an alignment layer formed thereon, and are bonded in a facing manner; a seal pattern formed in the non-display region between the first and second substrates to attach the first and second substrates; one or more first spreading preventing means formed to overlap with the seal pattern to prevent spreading of the alignment layer in the first substrate; and one or more second spreading preventing means formed to overlap with the seal pattern to prevent spreading of the alignment layer in the second substrate.

To achieve these and other advantages and in accordance with the purpose of this specification, as embodied and broadly described herein, a method for manufacturing a liquid crystal display (LCD) device, may include: forming one or more spreading preventing means in a non-display region of at least one of first and second substrates including a display region and a non-display region to prevent spreading of an alignment layer; and forming a seal pattern between first and second substrates such that the seal pattern overlaps with the one or more spreading preventing means, and attaching the first and second substrates.

To achieve these and other advantages and in accordance with the purpose of this specification, as embodied and broadly described herein, a method for manufacturing a liquid crystal display (LCD) device, may include: forming one or more first spreading preventing means preventing spreading of an alignment layer in a non-display region of a first substrate including a display region and the non-display region; forming one or more second spreading preventing means preventing spreading of the alignment layer in a non-display region of a second substrate corresponding to the first substrate; and forming a seal pattern between the first and second substrates such that the seal pattern overlaps with the first spreading preventing means and the second spreading preventing means, and attaching the first and second substrates.

In the case of the LCD device and the manufacturing method according to exemplary embodiments of the present disclosure, since the alignment layers and the seal pattern are formed in an overlapping manner and one or more alignment layer spreading preventing means are formed to prevent a degradation of adhesive strength of the seal pattern due to the characteristics of the alignment layers, a contact area between the seal pattern and the alignment layers is reduced, thus increasing adhesive strength of the seal pattern.

In addition, since the alignment layers and the seal pattern overlap, the bezel region can be significantly reduced to reduce an overall size of the LCD device, relative to the related art LCD device.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE ILLUSTRATED EMBODIMENTS

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a liquid crystal display (LCD) device according to an exemplary embodiment of the present disclosure will be described in detail with reference to the accompanying drawings.

Figure 1:
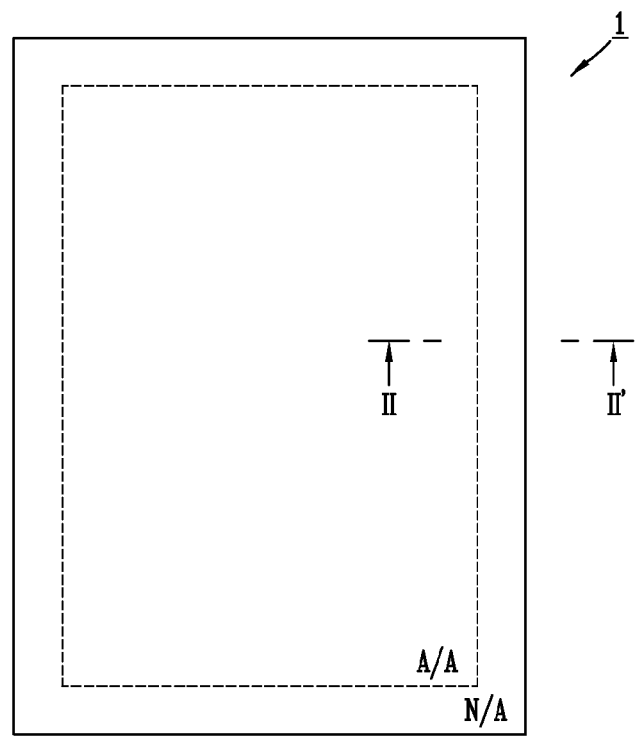
FIG. 1 is a schematic plan view of the related art liquid crystal display (LCD) device.
Figure 2:
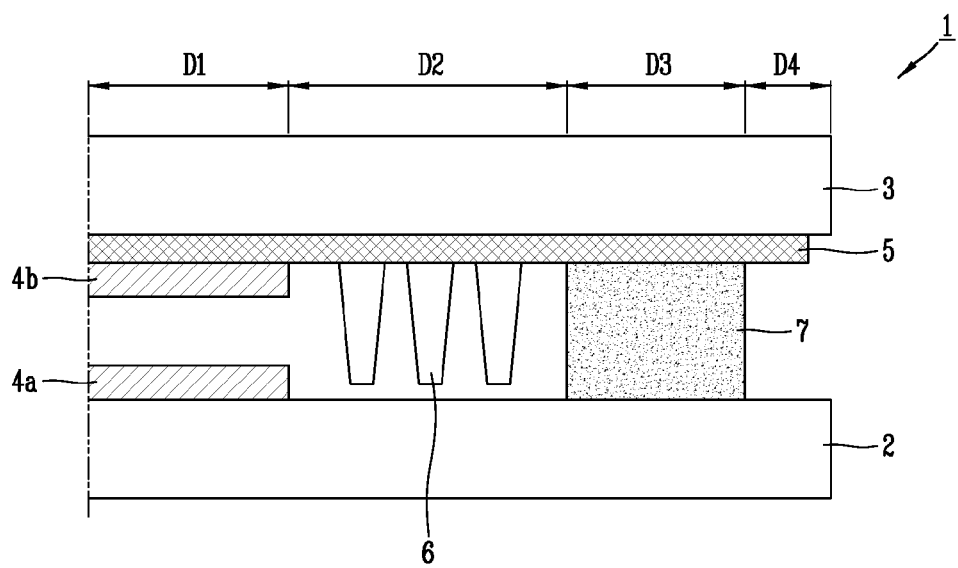
FIG. 2 is a cross-sectional view taken along line II-II' in FIG. 1.
Figure 3:
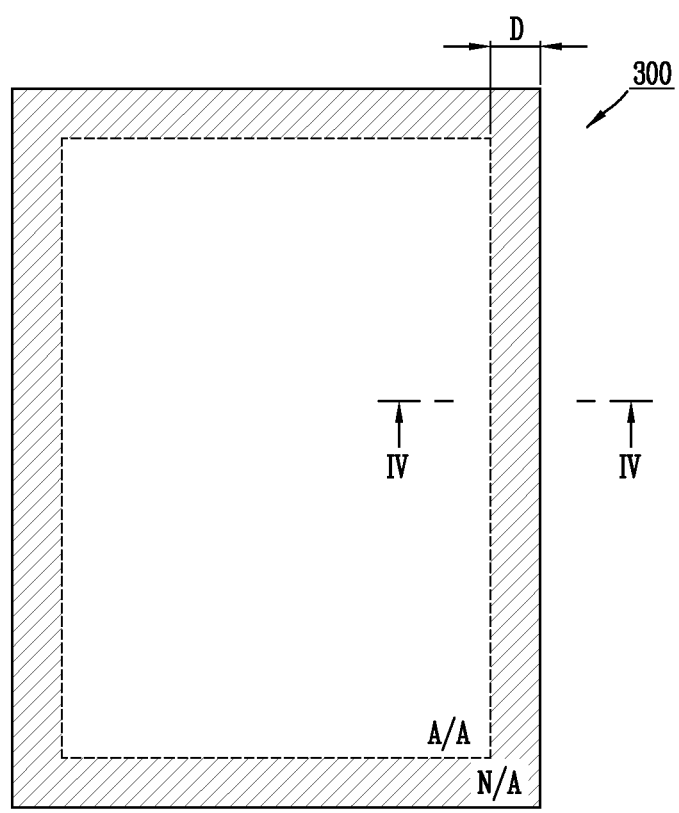
FIG. 3 is a schematic plan view of an LCD device according to an exemplary embodiment of the present disclosure.
Figure 4:
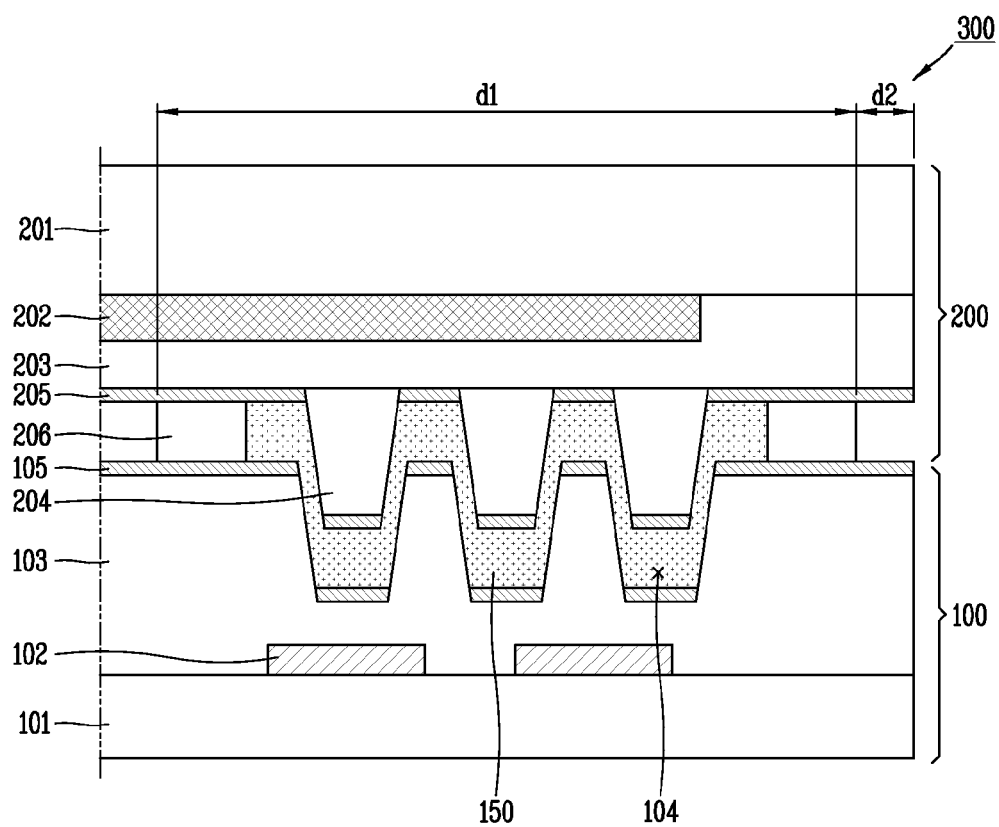
FIG. 4 is a cross-sectional view of an LCD device according to a first exemplary embodiment of the present disclosure taken along line IV-IV' in FIG. 3.
Figure 5:
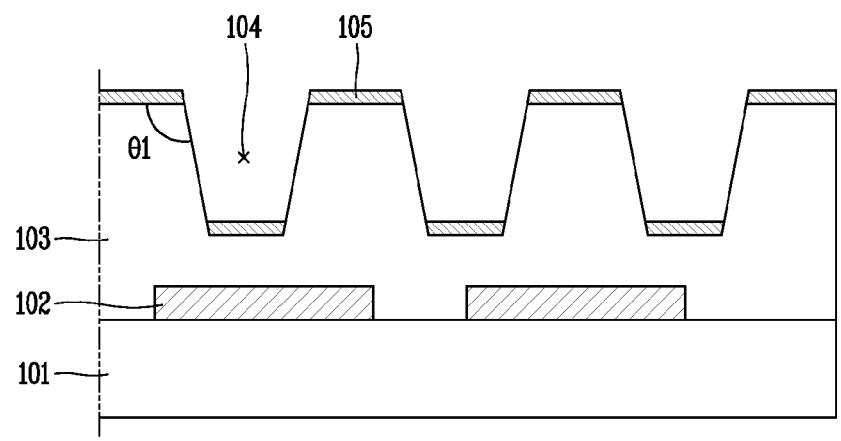
FIG. 5 is a cross-sectional view illustrating an array substrate of FIG. 4.
Figure 6:
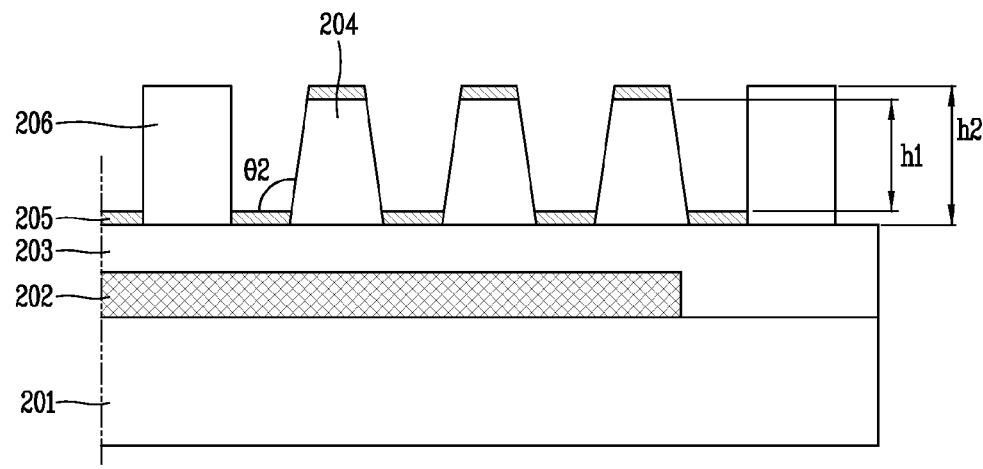
FIG. 6 is a cross-sectional view illustrating a color filter substrate of FIG. 4.

FIG. 3 is a schematic plan view of an LCD device according to exemplary embodiments of the present disclosure. FIG. 4 is a cross-sectional view of an LCD device according to a first exemplary embodiment of the present disclosure taken along line IV-IV' in FIG. 3. FIG. 5 is a cross-sectional view illustrating an array substrate of FIG. 4. FIG. 6 is a cross-sectional view illustrating a color filter substrate of FIG. 4.

Referring to FIGS. 3 and 4, and an LCD device 300 according to a first exemplary embodiment of the present disclosure may be formed by attaching an array substrate 100 and a color filter substrate 200 with a liquid crystal layer (not shown) interposed therebetween with a certain gap.

The LCD device 300 may include a display region A/A in which an image is substantially displayed and a non-display region N/A surrounding the display region A/A. Here, the non-display region N/A is a region covered by a bezel, and a total width D of the non-display region N/A may be equal to a width of the bezel.

A plurality of thin film transistors (not shown) and signal lines (not shown) may be formed in the display region A/A. For example, in the display region A/A, a plurality of gate lines (not shown) and a plurality of data lines (not shown) may be formed to cross each other on a first substrate 101. Pixels (not shown) may be formed in regions formed as the gate lines and the data lines cross each other, and a plurality of TFTs may be formed in intersections of the gate lines and the data lines.

A wiring pattern 102 may be formed in the non-display region N/A of the array substrate 100. For example, the wiring pattern 102 for a signal transmission may be formed on the first substrate 101, and a protective film 103 having a predetermined thickness may be formed on the wiring pattern 102. An alignment layer, for example, a first alignment layer 105, may be formed on the protective layer 103. Here, the protective layer 103 and the first alignment layer 105 may be formed in the same manner in the display region A/A of the array substrate 100.

Also, an alignment layer spreading preventing means for reducing an area in which a seal pattern 150 and the first alignment layer 105 overlap, while preventing spreading of the first alignment layer 105, may be formed in the non-display region N/A of the array substrate 100.

Referring to FIGS. 4 and 5, one or more holes 104 may be formed in the non-display region N/A of the array substrate 100. Such holes 104 may prevent spreading of the first alignment layer 105 and reduce a contact area of the first alignment layer 105 and the seal pattern 150.

The holes 104 may be formed by patterning the protective layer 103 before the alignment layer 105 is formed on the protective layer 103, and in this case, the protective layer 103 may be patterned to have a predetermined width at predetermined intervals.

Since the holes 104 are formed in the protective layer 103, the first alignment layer 105 remains only in the lower surface of the holes 104. Namely, the first alignment layer 105 does not remain on the side walls of the holes 104, and although the seal pattern 150 is formed to overlap with the first alignment layer 105, an area in which the seal pattern 150 and the first alignment layer 105 are in contact can be reduced due to the presence of the holes 104. Thus, adhesive strength between the seal pattern 150 and the array substrate 100 can be enhanced.

Here, the amount, width, and depth of the holes 104 formed in the protective layer 103 are not limited. However, in consideration of the fact that the holes 104 should correspond to column spacers 204 formed in a color filter substrate 200 as described hereinafter, the holes 104 may be formed to have an amount, width, and depth corresponding to those of the column spacers.

Also, the side walls of the holes 104 may be formed to have a slope as steep as possible in order to prevent remaining of the first alignment layer 105. For example, the side walls of the holes 104 may be formed to have a slope angle θ1 of about 90 degrees with respect to an upper surface of the protective layer 103, and accordingly, the first alignment layer 105 does not remain on the side walls of the holes 104.

Referring back to FIGS. 4 and 5, a plurality of color filters (not shown) and a black matrix may be formed in the color filter substrate 200.

A plurality of R, G, and B color filters may be formed in the display region A/A of the color filter substrate 200. For example, a plurality of R, G, and B color filters may be formed on a second substrate 201 in the display region A/A such that they correspond to pixels formed in the array substrate 100.

Also, the black matrix 202 may be formed in a remaining region excluding a region in which the color filters are formed in the display region A/A of the color filter substrate 200 and in the non-display region N/A. For example, the black matrix 202 may be formed in a remaining portion, excluding a portion corresponding to the pixels of the array substrate 100, on the second substrate 201 to define a color filter formation region. Namely, after the black matrix 202 is first formed on the second substrate 201, the color filters may be formed in regions exposed by the black matrix 202.

Also, a planarization layer 203 may be formed on the color filters and the black matrix in order to planarize the surface, and a second alignment layer 205 may be formed on the planarization layer 203. The second alignment layer 205 may align liquid crystal molecules of a liquid crystal layer together with the first alignment layer 105 formed on the array substrate 100.

Also, an alignment layer spreading preventing means may be formed in the non-display region N/A of the color filter substrate 200 in order to reduce an area in which the seal pattern 150 and the second alignment layer 205 overlap and contact with each other and prevent spreading of the second alignment layer 205.

Referring to FIGS. 4 and 6, one or more column spacers 204 may be formed in the non-display region N/A of the color filter substrate 200. The columnar spacer 204 may prevent spreading of the second alignment layer 205 to reduce a contact area of the second alignment layer 205 and the seal pattern 150.

The column spacers 204 may be formed by applying a spacer formation material to the planarization layer 203 and pattering the same, before the second alignment layer 205 is formed on the planarization layer 203. In this case, the column spacers 204 may be formed to have a predetermined width at regular intervals.

Since the column spacers 204 are formed on the planarization layer 203, the second alignment layer 205 formed on the planarization layer 203 remain only on an upper surface of the column spacers 204. Namely, the second alignment layer 205 does not remain on side walls of the column spacers 204, and although the seal pattern 150 is formed to overlap with the second alignment layer 205, an area in which the seal pattern 150 and the second alignment layer 205 are in contact may be reduced due to the presence of the column spacers 204. Thus, adhesive strength between the seal pattern 150 and the color filter substrate 200 can be enhanced.

Here, the column spacers 204 may be formed to correspond to the amount of the holes 104 formed on the array substrate 100. Also, the column spacers 204 may be formed to have a height (h1) equal to a depth of the holes 104.

Also, the column spacers 204 may be formed to correspond to the holes 104 of the array substrate 100 but may have a width smaller than that of the holes 104. This is for an attachment margin of the array substrate 100 and the color filter substrate 200, and one side wall of the holes 104 and one side wall of the columnar spacer 204 corresponding thereto may be spaced apart from one another by a distance equal to or smaller than approximately 7 um.

Also, the side wall of the column spacer 204 may have a slope as steep as possible in order to prevent remaining of the second alignment layer 105. For example, a side wall of the column space 204 may be formed to have a slope angle θ2 of approximately 90 degrees with respect to the upper surface of the planarization layer 203. Thus, the second alignment layer 205 does not remain on the side wall of the column spacer 204.

Meanwhile, a dam 206 may be further formed in the color filter substrate 200 in order to surround the outer portions of the seal pattern 150 to prevent leakage of the seal pattern 150 to the outside and uniformly maintain a gap between the array substrate 100 and the color filter substrate 200.

The dam 206 may be formed as a pair to be adjacent to the column spacer 204 formed in the outermost portion among the column spacers 204 formed in the color filter substrate 200. The dam 206 may be formed to have a height equal to that of the column spacer 204 (h1=h2) or may be formed to have a height greater than that of the column spacer 204 (h1<h2).

Also, the dam 206 may be formed in the array substrate 100, and in this case, the dam 206 may be formed as a pair adjacent to the holes 104 formed in the outermost portion among the holes 104 formed in the array substrate 100.

Also, in a case in which glass fiber is used in the seal pattern 150, the dam 206 may be omitted.

Referring to FIG. 4, the array substrate 100 in which one or more holes 104 are formed as an alignment layer spreading preventing means and the color filter substrate 200 in which one or more column spacers 204 are formed as an alignment layer spreading preventing means may correspond to be attached.

In other words, the array substrate 100 and the color filter substrate 200 may be individually manufactured through separate processes, and the two substrates may be sealed to be attached by the seal pattern 150 formed in the non-display region N/A of the substrate, namely, in the outer edges of the substrate.

Here, the seal pattern 150 may be formed to correspond to the holes 104 of the array substrate 100 or may be formed to correspond to the column spacers 204 of the color filter substrate 200.

One surface of the seal pattern 150 overlaps with the first alignment layer 105 of the array substrate 100 and the other surface thereof overlaps with the second alignment layer 205 of the color filter substrate 200. Here, as mentioned above, a contact area between the seal pattern 150 and the first alignment layer 105 and the second alignment layer 205 may be reduced due to the presence of the holes 104 of the array substrate 100 and the column spacers 204 of the color filter substrate 200. Thus, adhesive strength of the seal pattern 150 and the array substrate 100 or that of the seal pattern 150 and the color filter substrate 200 can be enhanced.

Also, since the seal pattern 150 is formed to overlap with the first alignment layer 105 and the second alignment layer 205, a width of the non-display region N/A of the LCD device 300 can be reduced. In other words, since the non-display region N/A of the LCD device 300 according to the present exemplary embodiment corresponds to the sum of a seal pattern region d1 and a cut region d2, the alignment layer margin region and the spacer region required in the related art LCD device can be omitted, reducing an overall width of the non-display region N/A. Thus, a width of the bezel of the LCD device 300 is reduced to reduce an overall size.

Meanwhile, in the LCD device 300 of FIG. 4, the case in which the holes 104 are formed in the array substrate 100 and the column spacers 204 are formed in the color filter substrate 200 has been described as an example, but the present inventive concept is not limited thereto. For example, column spacers may be formed in the array substrate 100 and holes may be formed to correspond to the columnar spaces in the color filter substrate 200.

Figure 7:
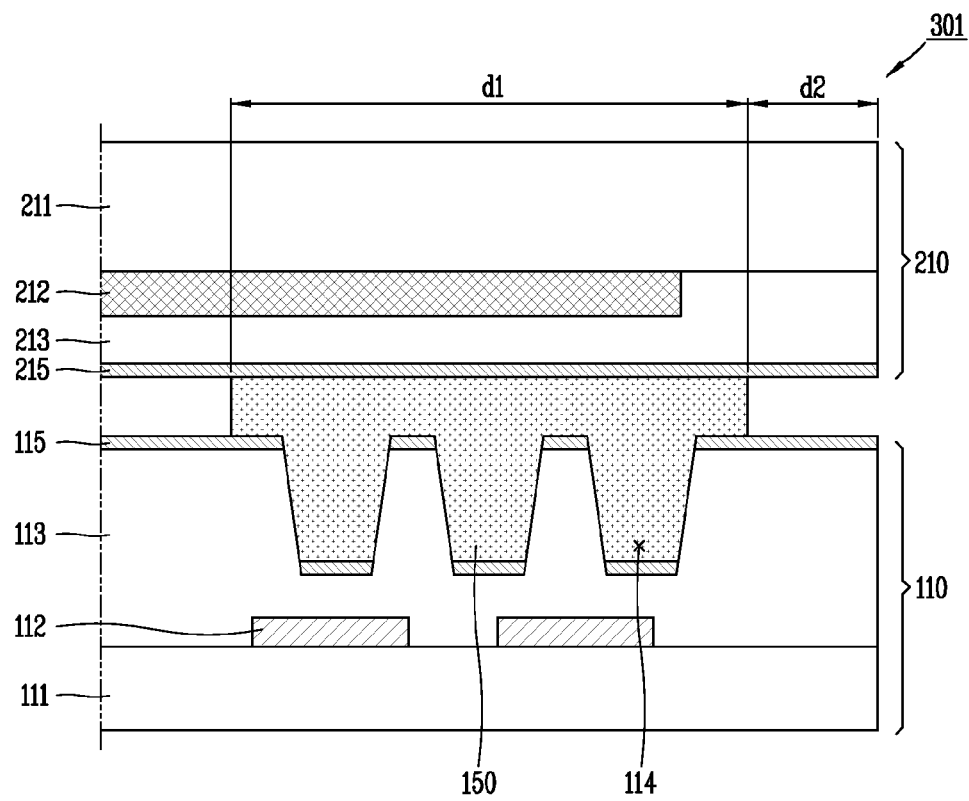
FIG. 7 is a cross-sectional view of an LCD device according to a second exemplary embodiment of the present disclosure.
Figure 8:
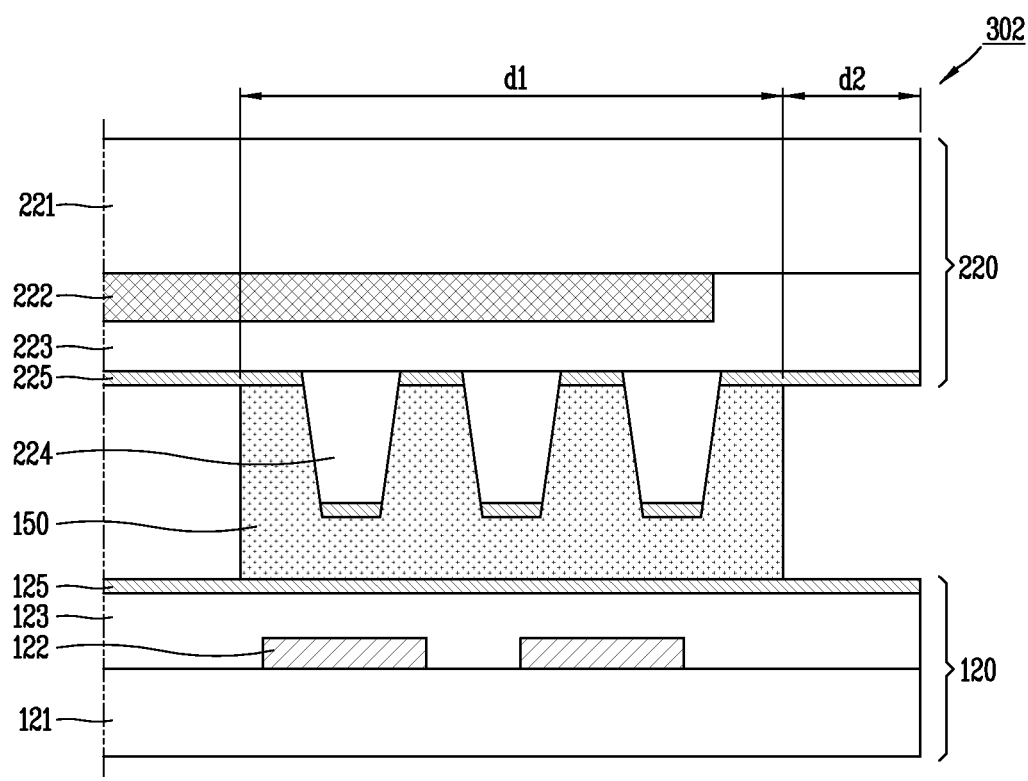
FIG. 8 is a cross-sectional view of an LCD device according to a third exemplary embodiment of the present disclosure.
Figure 9:
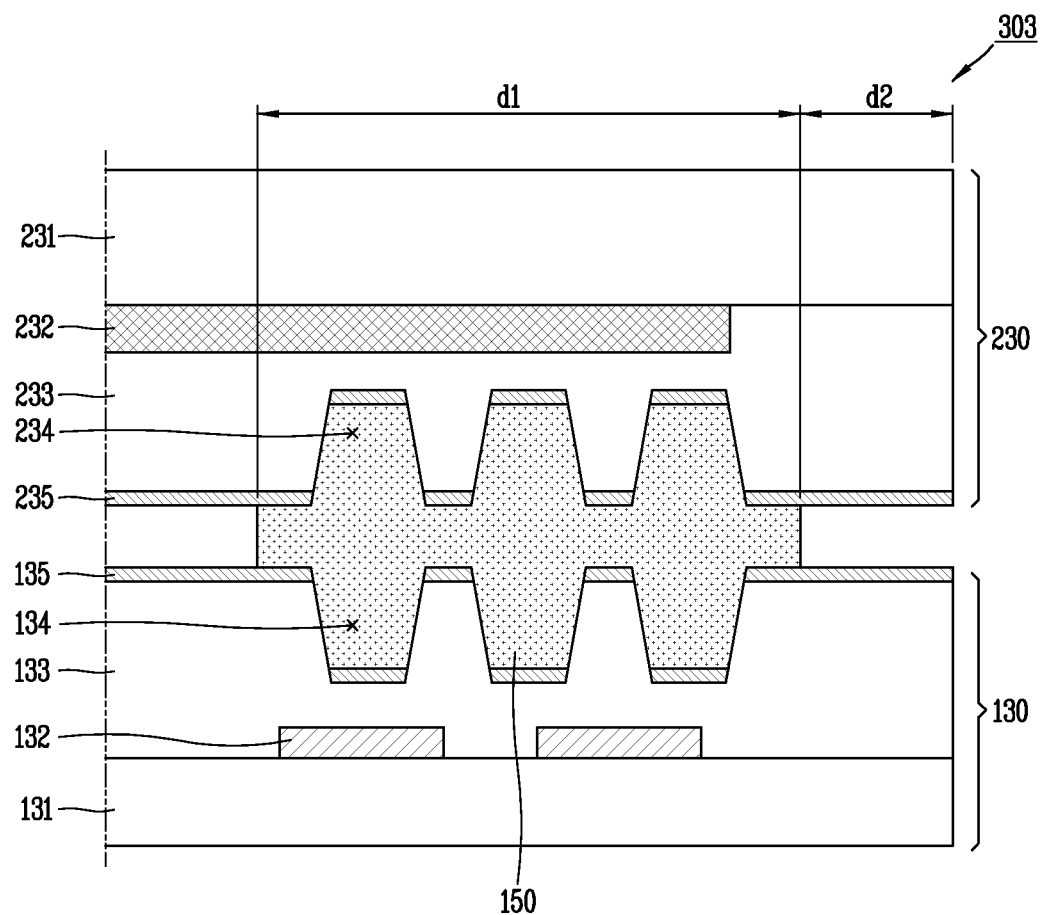
FIG. 9 is a cross-sectional view of an LCD device according to a fourth exemplary embodiment of the present disclosure.

FIG. 7 is a cross-sectional view of an LCD device according to a second exemplary embodiment of the present disclosure. FIG. 8 is a cross-sectional view of an LCD device according to a third exemplary embodiment of the present disclosure. FIG. 9 is a cross-sectional view of an LCD device according to a fourth exemplary embodiment of the present disclosure.

Hereinafter, LCD devices according to other exemplary embodiments of the present disclosure will be described in detail with reference to FIGS. 7 through 9. For the purposes of description, description of members having the same function as those described above with reference to FIG. 4 will be omitted.

Referring to FIG. 7, an LCD device 301 according to the second exemplary embodiment of the present disclosure may be formed by attaching an array substrate 110 and a color filter substrate 210 by means of a seal pattern 150 formed on outer edges thereof.

Here, one or more holes 114 may be formed as an alignment layer spreading preventing means in a non-display region of the array substrate 110 such that they overlap with the seal pattern 150.

The array substrate 110 may include a wiring pattern 112, a protective layer 113, and a first alignment layer 115 formed on a first substrate 111. One or more holes 114 may be formed in the protective layer 113 to prevent spreading of the first alignment layer. The holes 114 may be formed by patterning the protective layer 113 at regular intervals before the formation of the first alignment layer 115.

The color filter substrate 210 may include a black matrix 212, a planarization layer 213, and a second alignment layer 215 formed on a second substrate 211.

The array substrate 110 and the color filter substrate 210 may be attached in a corresponding manner, and the seal pattern 150 may be formed on outer edges thereof to encapsulate the two substrates.

The seal pattern 150 may be formed to correspond to the holes 114 of the array substrate 110 and overlap with the first alignment layer 115 and the second alignment layer 215.

Here, a contact area of the seal pattern 150 and the first alignment layer 115 may be reduced due to the presence of the one or more holes 114 formed in the array substrate 110. Thus, adhesive strength between the seal pattern and the array substrate 110 can be increased.

Also, although not shown, a dam (not shown) surrounding outer edges of the seal pattern 150 to prevent leakage of the seal pattern 150 may be further formed in the array substrate 110 or the color filter substrate 210.

Referring to FIG. 8, an LCD device 302 according to the third exemplary embodiment of the present disclosure may be formed by attaching an array substrate 120 and a color filter substrate 220 by means of a seal pattern 150 formed on outer edges thereof.

Here, one or more column spacers 224 may be formed as an alignment layer spreading preventing means in a non-display region of the color filter substrate 220 such that they overlap with the seal pattern 150.

The array substrate 120 may include a wiring pattern 122, a protective layer 123, and a first alignment layer 125 formed on a first substrate 121.

The color filter substrate 220 may include a black matrix 222, a planarization layer 223, and a second alignment layer 225 formed on a second substrate 221. One or more column spacers 224 may be formed on the planarization layer 223 to prevent spreading of the second alignment layer 225. The column spacers 224 may be formed by applying a spacer formation material to the planarization layer 223 and patterning the same, before the second alignment layer 225 is formed.

The array substrate 120 and the color filter substrate 220 may be attached in a corresponding manner, and the seal pattern 150 may be formed on outer edges thereof to encapsulate the two substrates.

The seal pattern 150 may be formed to correspond to the column spacers 224 of the color filter substrate 220 and overlap with the first alignment layer 125 and the second alignment layer 225.

Here, a contact area of the seal pattern 150 and the second alignment layer 225 may be reduced due to the presence of the one or more spacer 224 formed in the color filter substrate 220. Thus, adhesive strength between the seal pattern and the color filter substrate 220 can be increased.

Also, although not shown, a dam (not shown) surrounding outer edges of the seal pattern 150 to prevent leakage of the seal pattern 150 may be further formed in the array substrate 120 or the color filter substrate 220.

Referring to FIG. 9, an LCD device 303 according to the fourth exemplary embodiment of the present disclosure may be formed by attaching an array substrate 130 and a color filter substrate 230 by means of a seal pattern 150 formed on outer edges thereof.

Here, one or more first holes 134 may be formed as an alignment layer spreading preventing means in a non-display region of the array substrate 130 such that they overlap with the seal pattern 150, and one or more second holes 234 may be formed as an alignment layer spreading preventing means in a non-display region of the color filter substrate 230 such that they overlap with the seal pattern 150.

The array substrate 130 may include a wiring pattern 132, a protective layer 133, and a first alignment layer 135 formed on a first substrate 131. One or more first holes 134 may be formed in the protective layer 133 to prevent spreading of the first alignment layer 135. The first holes 134 may be formed by patterning the protective layer 133 at regular intervals before the first alignment layer 135 is formed.

The color filter substrate 230 may include a black matrix 232, a planarization layer 233, and a second alignment layer 235 formed on a second substrate 221. One or more second holes 234 may be formed on the planarization layer 233 to prevent spreading of the second alignment layer 235. The second holes 234 may be formed by patterning the planarization layer 233 at regular intervals, before the second alignment layer 235 is formed. Here, the second holes 234 may be formed to have a width and amount equal to those of the first holes 134 in positions corresponding to the first holes.

The array substrate 130 and the color filter substrate 230 may be attached in a corresponding manner, and the seal pattern 150 may be formed on outer edges thereof to encapsulate the two substrates.

The seal pattern 150 may be formed to correspond to the first holes 134 of the array substrate 130 and the second holes 234 of the color filter substrate 230 and overlap with the first alignment layer 135 and the second alignment layer 235.

Here, a contact area of the seal pattern 150 and the first alignment layer 135 and that of the seal pattern 150 and the second alignment layer 235 may be reduced due to the presence of the first holes 134 formed in the array substrate 130 and the second holes 234 formed in the color filter substrate 230. Thus, adhesive strength between the seal pattern 150 and the array substrate 130 and that between the seal pattern 150 and the color filter substrate 230 may be increased.

Also, although not shown, a dam (not shown) surrounding outer edges of the seal pattern 150 to prevent leakage of the seal pattern 150 may be further formed in the array substrate 130 or the color filter substrate 230.

As described above with reference to FIGS, 7 through 9, in the case of the LCD devices 301, 302, and 303 according to various exemplary embodiments of the present disclosure, since the seal pattern 150 is formed to overlap with the first alignment layers 115, 125, and 135 or the second alignment layers 215, 225, and 235, the widths of the non-display regions N/A in the LCD devices 301, 302, and 303 can be reduced.

Namely, in the LCD devices 301, 302, and 303 according to various exemplary embodiments of the present disclosure, the non-display region N/A is equal to the sum of the seal pattern region d1 and the cut region d2, the alignment layer margin region and the spacer region required in the related art LCD device can be omitted. Thus, since the widths of the non-display regions N/A of the LCD devices 301, 302, and 303 are reduced, a width of the bezel is accordingly reduced, reducing the overall size.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device comprising:
a liquid crystal panel including first and second substrates which include a display region and a non-display region, each substrate having an alignment layer with separate segments formed thereon, wherein the substrates are bonded in a facing manner;
a seal pattern formed in the non-display region between the first and second substrates to attach the first and second substrates; and
a protective layer on the first substrate, wherein the protective layer includes a plurality of protrusions and recessed portions,
wherein portions of the protective layer overlap with the seal pattern on at least one of the first and second substrates and prevent spreading of the alignment layer to reduce a contact area of the seal pattern and the alignment layer.

2. The LCD device of claim 1, wherein the plurality of protrusions and recessed portions are formed by patterning the protective layer at regular intervals.

3. The LCD device of claim 1, further comprising a plurality of column spacers formed in the second substrate.

4. The LCD device of claim 3, further comprising a planarization layer formed in the second substrate,
wherein the plurality of column spacers are formed at regular intervals on the planarization layer.

5. The LCD device of claim 4, wherein the plurality of column spacers align with the plurality of recessed portions of the protective layer.

6. The LCD device of claim 4, wherein the planarization layer includes a plurality of protrusions and recessed portions.

7. A liquid crystal display (LCD) device comprising:
a liquid crystal panel including first and second substrates which include a display region and a non-display region, each substrate having an alignment layer formed thereon, wherein the substrates are bonded in a facing manner;
a seal pattern formed in the non-display region between the first and second substrates to attach the first and second substrates;
a protective layer on the first substrate, wherein the protective layer includes a plurality of protrusions and recessed portions,
wherein portions of the protective layer overlap with the seal pattern to prevent spreading of the alignment layer on the first substrate; and
one or more column spacers formed to overlap with the seal pattern to prevent spreading of the alignment layer on the second substrate.

8. The LCD device of claim 7,
wherein the plurality of recessed portions of the protective layer and the column spacers are formed to correspond to each other.

9. The LCD device of claim 8, wherein the recessed portions of the protective layer are formed to have a width greater than that of the column spacers.

10. The LCD device of claim 1 or 7, further comprising a dam formed in at least one of the first and second substrates and surrounding outer edges of the seal pattern.

11. A method for manufacturing a liquid crystal display (LCD) device, the method comprising:
   forming a liquid crystal panel including first and second substrates which include a display region and a non-display region;
   forming a seal pattern in the non-display region between the first and second substrates, and attaching the first and second substrates to face each other;
   forming a protective layer in the non-display region of the first substrate, wherein the protective layer is patterned to include a plurality of protrusions and recessed portions; and
   forming an alignment layer on the entire surface of the first substrate, wherein the alignment layer has discontinuous segments, and
   wherein portions of the protective layer overlap with the seal pattern on at least one of the first and second substrates and prevent spreading of the alignment layer to reduce a contact area of the seal pattern and the alignment layer.

12. The method of claim 11, further comprising:
   forming a planarization layer in the non-display region of the second substrate;
   applying a spacer formation material to the planarization layer and patterning the material to form one or more column spacers; and
   forming an alignment layer on the entire surface of the second substrate.

13. A method for manufacturing a liquid crystal display (LCD) device, the method comprising:
   forming a liquid crystal panel including first and second substrates which include a display region and a non-display region, each substrate having an alignment layer formed thereon;
   forming a seal pattern between the first and second substrates;
   forming a protective layer in the non-display region of the first substrate, wherein the protective layer is patterned to include a plurality of protrusions and recessed portions,
   wherein portions of the protective layer overlap with the seal pattern to prevent spreading of the alignment layer on the first substrate; and
   forming one or more column spacers to overlap with the seal pattern to prevent spreading of the alignment layer on the second substrate.

14. The method of claim 13, further comprising:
   forming a planarization layer in the non-display region of the second substrate and forming the one or more column spacers on the planarization layer such that the one or more column spacers correspond to the recessed portions of the protective layer of the first substrate.

15. The method of claim 14, wherein the recessed portions of the protective layer are formed to have a width greater than that of the column spacers.

16. The method of claim 13, wherein the plurality of recessed portions of the protective layer and the column spacers are formed to correspond to each other.

17. A liquid crystal display (LCD) device, comprising:
   a liquid crystal panel including first and second substrates which includes a display region and a non-display region, each substrate having an alignment layer formed thereon, wherein the substrates are bonded in a facing manner;
   a protective layer on an entire surface of the first substrate;
   a seal pattern formed on the protective layer in the non-display region between the first and second substrates;
   a planarization layer on the second substrate; and
   column spacers on the planarization layer, the column spacers formed to overlap with the seal pattern to prevent spreading of the alignment layer on the second substrate,
   wherein the seal pattern has recessed portions corresponding to the column spacers.

\* \* \* \* \*